United States Patent [19]

Kondo et al.

[11] 4,074,795
[45] Feb. 21, 1978

[54] CALIPER MOUNTING ARRANGEMENT FOR A DISC BRAKE

[75] Inventors: Toshio Kondo, Chiryu; Masakazu Ishikawa, Toyota; Masayoshi Katagiri, Toyota; Jiro Kizaki, Toyota, all of Japan

[73] Assignee: Aisin Seiki Kabushiki Kaisha, Japan

[21] Appl. No.: 614,629

[22] Filed: Sept. 18, 1975

[30] Foreign Application Priority Data

Oct. 1, 1974 Japan .............................. 49-113630

[51] Int. Cl.² ............................................. F16D 65/02
[52] U.S. Cl. ................................. 188/73.3; 188/73.5
[58] Field of Search ..................... 188/72.4, 73.3, 73.4, 188/73.5

[56] References Cited

U.S. PATENT DOCUMENTS

| | | | |
|---|---|---|---|
| 3,442,354 | 5/1969 | Belart | 188/73.3 |
| 3,625,314 | 12/1971 | Rinker | 188/73.3 |
| 3,628,639 | 12/1971 | Daley | 188/73.3 |
| 3,688,876 | 9/1972 | Hirai et al. | 188/73.3 |
| 3,805,925 | 4/1974 | Schoenhenz | 188/73.3 |
| 3,838,753 | 10/1974 | Kestermeier et al. | 188/73.3 |

FOREIGN PATENT DOCUMENTS 1,375,697   11/1974   United Kingdom ................. 188/73.4

*Primary Examiner*—Trygve M. Blix
*Assistant Examiner*—Edward R. Kazenske
*Attorney, Agent, or Firm*—Pierce, Scheffler & Parker

[57] ABSTRACT

Fluid pressure operated disc brakes of a vehicle of the kind having a stationary member adapted to be secured to a non-rotatable part of a wheel assembly, a movable member on the stationary member, fluid pressure operated brake actuator incorporated into the movable member, a brake pad on one side of the friction disc slidably guided by the stationary member and directly responsive to the fluid pressure operated brake actuator, and a second friction pad on the opposite side of the fraction disc. A deformable resilient spacer is interposed between the stationary member and the movable member for resiliently mounting the movable member on the stationary member in restorably and axially shiftable relation to the stationary member due to the deformation of the resilient spacer.

4 Claims, 4 Drawing Figures

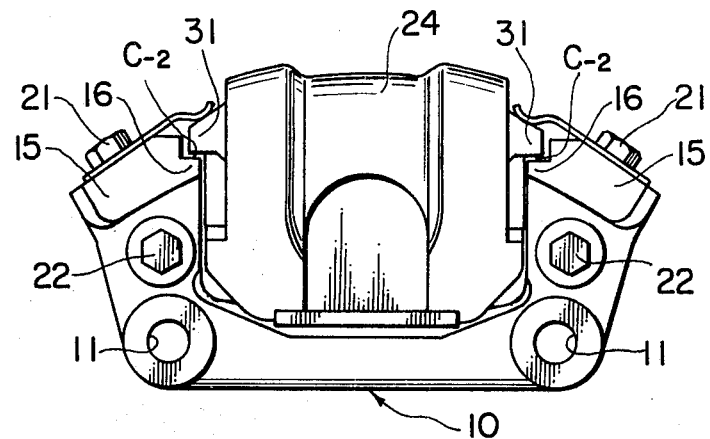
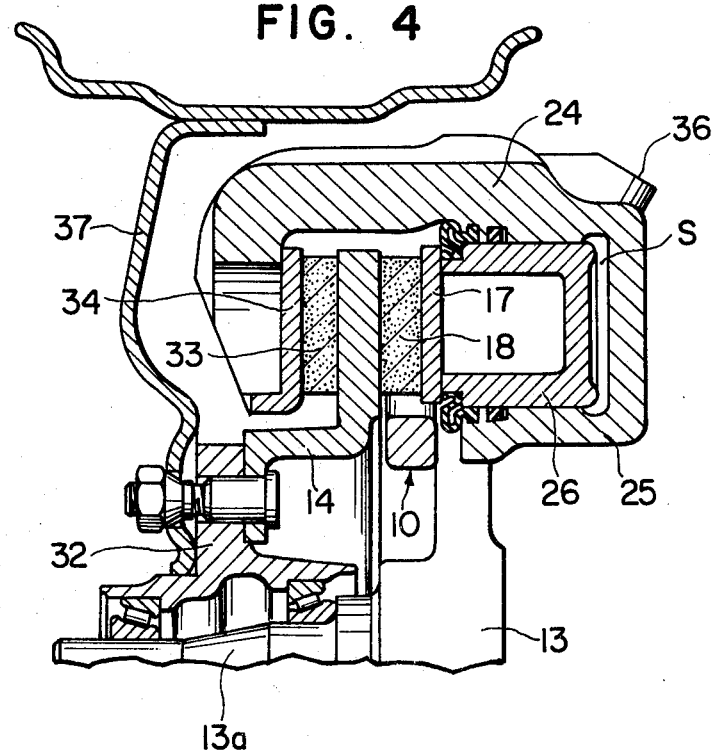

CALIPER MOUNTING ARRANGEMENT FOR A DISC BRAKE

BACKGROUND OF THE INVENTION

This invention relates to improvement in disc brakes of the kind in which friction pads are adapted to be urged by hydraulic acting means into engagement with opposite faces of a rotatable friction disc and more particularly to fluid pressure operated disc brakes of the kind having a stationary member adapted to be secured to a non-rotatable part of a wheel assembly, a movable member movable on the stationary member, fluid pressure operated brake actuating means incorporated into the movable member, a brake pad or pads on one side of the friction disc slidably guided by the stationary member and directly responsive to the fluid pressure operated brake actuating means, and a second friction pad or pads on the opposite side of the friction disc, the reaction force derived from contact with the brake disc of the pad or pads directly responsive the brake actuating means resulting in movement of the movable member to bring the second pad or pads on the opposite side of the brake disc into contact therewith.

It has been the practice in conventional brakes of this kind that the movable member is directly sliding fit on the stationary member. In order to attain ease of installation in such sliding fit, tolerance is substantially limited to a very slight one in the manufacture of such parts. This is considered to be a disadvantage in the manufacturing costs and for convenience in installation of the brake. Further, there exists normally the possibility of corroding with rust in such direct sliding fit, owing to water, moisture or humidity. It has been proven to be a fact in the art that corrosion is apt to be exhibited particularly where two or more different steel parts are in contact relation under moisture condition.

While various means have been previously employed for avoiding the above mentioned disadvantage and defect, none have proven, in our view point, satisfactory.

SUMMARY OF THE INVENTION

Principal object of the present invention therefore is to provide a disc brake having improved means for normally preventing the movable member from having a sliding fit on the stationary member in rest position of the brake with a slight clearance kept therebetween while permitting the movable member to be axially slidingly fit on the stationary member in active condition of the brake so that the stationary member takes the resulting drag force applied to the movable member.

The foregoing object and others are attained according to at least one aspect of the present invention through provision of a deformable resilient spacer means interposed between the stationary member and the movable member for assembling the movable member on the stationary member in restorably and axially shiftable relation to the stationary member due to the deformation of the resilient means with a slight clearance normally kept between the stationary member and the movable member except in the acting condition of the brake.

Thus, in the disclosed embodiment a friction disc is secured to a wheel of a vehicle wheel assembly to rotate therewith, friction pads engaging opposite faces of the friction disc, a stationary member secured to a fixed portion of the wheel assembly adjacent to the disc, a movable member of U-shaped section, a deformable resilient spacer means interposed between the stationary member and the movable member for assembling the movable member on the stationary member in restorably shiftable relation to the stationary member due to the deformable character of the resilient spacer means and fluid pressure operated brake actuating means in the movable member. The stationary member comprises further a guiding member to slidingly guide the movable member thereon while being kept spaced slightly from the movable member by the resilient spacer means in rest position of the brake. The first one of the pads is a sliding fit on the stationary member and in engagement directly with the fluid pressure operated brake actuating means to be urged into contact with one face of the disc and the second one of the pads is carried by the movable member to be brought into contact with the opposite face of the disc under reaction force derived from application of the first pad to the friction disc.

BRIEF DESCRIPTION OF THE DRAWING

FIG. 3 is an end view as seen from the bottom of FIG. 1; and

FIG. 4 is a cross sectional view taken along the line IV—IV of FIG. 1 and also showing part of a wheel assembly on which the brake is mounted, a part of the wheel being shown.

DESCRIPTION OF THE PREFERRED EMBODIMENT

Figure 1:
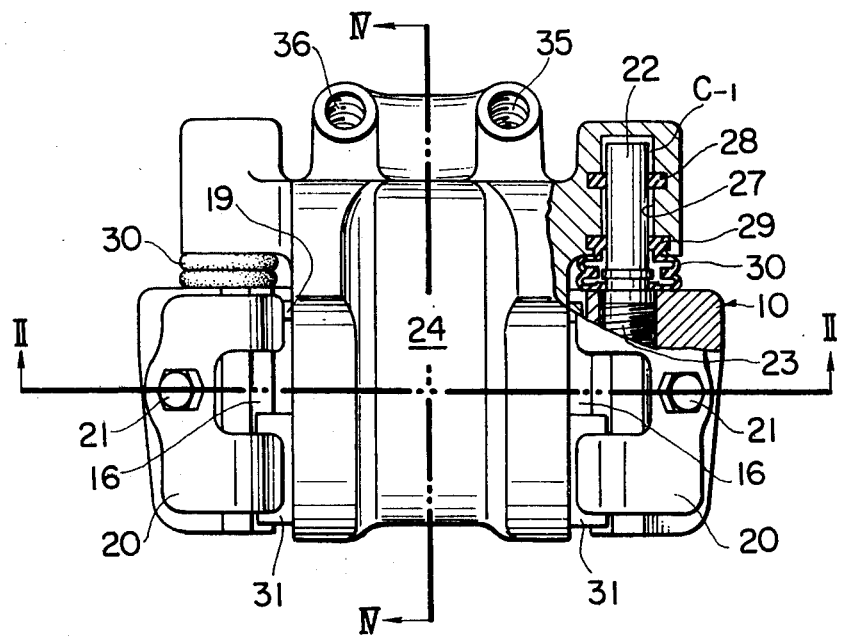
FIG. 1 is a plan view of a brake according to the present invention.
Figure 2:
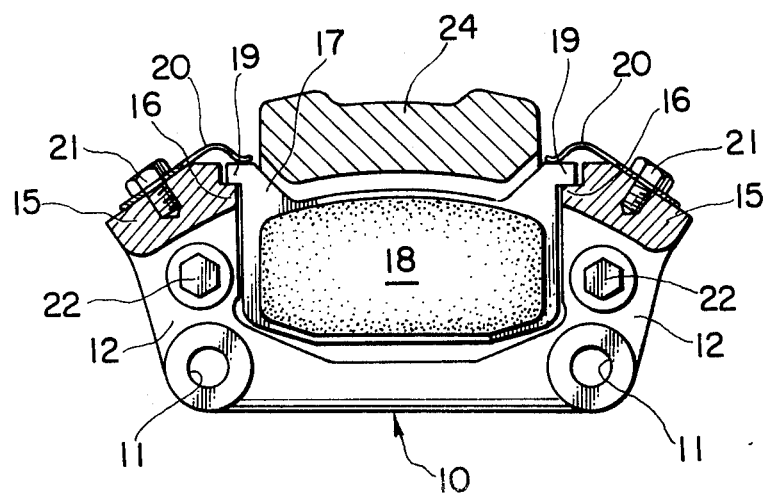
FIG. 2 is a cross sectional view along the line II—II of FIG. 1.

In the brake illustrated in FIGS. 1 to 4, a stationary member generally indicated at 10 has a pair of spaced openings 11 adapted to receive bolts (not shown) by which the member 10 is secured to a fixed support 13 (FIG. 4) of a wheel axle 13a forming a stationary part of a wheel assembly, the stationary member 10 being secured to the stationary part adjacent to one side of a brake disc 14 (FIG. 4). The stationary member 10 has a pair of radially extending spaced lugs 12 so that the member 10 is of U-shaped form as will be seen in FIG. 2.

A pair of arms 15 extend from the lugs 12 in parallel to the rotational axis of the friction disc 14. On the inner faces of the arms 15 are formed with a pair of parallel guide rails 16 which slidably guide a rigid backing plate 17 to which is bonded or otherwise secured a friction pad 18. The backing plate 17 has a pair of ears 19 at both sides to be hung from the guide rails 16 and a sliding fit thereon as will be seen in FIG. 2. Leaf springs 20 are bolted to the arms 15 by bolts 21. The backing plate 17 is then free to slide axially on the guide rails 16 but rattle is prevented by the springs 20.

A pair of parallel pins 22 are secured to the stationay member 10 by screws 23 thereof (only one screw 23 is revealed in FIG. 1, at the right), in parallel to the rotational axis of the brake disc 14. A saddle or movable member 24 is mounted on the stationary member 10 by the pins 22 so as to be shiftable relative thereto in the axial direction. A cylinder 25 is incorporated in the saddle member 24 and has a piston 26 therein. As will be seen in FIG. 1, the pins 22 are received within blind bores 27 formed in the saddle member 24. The dimension of the pins 22 is slightly less than the internal diametrical dimension of the bores 27 so that a clearance C-1 is ensured between the internal face of the bores 27 and the outer faces of the pins 22. Within the clearance C-1 is provided a pair of spaced rubber rings 28 and 29 of smaller internal diameter than the outer diameter of the pins 22. Both rubber rings 28 and 29 are embedded in the corresponding annular grooves in the internal face of the bores 27 for positioning purpose with the stored elastic energy kept effective in binding the pins 22 due to their smaller diametrical dimension. The rings 29 are integral with rubber boots 30 at the open ends of the bores 27 to exclude dirt from the clearance C-1. It should be noted that the saddle member 24 is resiliently mounted on the pins 22 through means of the deformable rubber rings 28 and 29 and the saddle member 24 is shiftable relative to the stationary member 10 in the axial direction of the bores 27 due to deformation exhibited in the rubber rings 28 and 29. This is important to obtain the desired result which will be explained as the description proceeds.

As shown in FIGS. 3 and 1, the saddle member 24 has at both sides ears or lugs 31 located above the guide rails 16 but a clearance C-2 is normally ensured therebetween by the rubber rings 28 and 29 in rest position of the brake, but rattle is prevented also by the plate springs 20. Such clearance C-2 is also important to obtain the desired results as will be explaned hereinafter.

Referring to FIG. 4, it is seen that the saddle member 24 straddles a peripheral portion of the brake disc 14 which is bolted to the wheel hub 32 carrying the wheel 37. The piston 26 working in the hydraulic cylinder 25 is adapted to apply to the disc 14 the directly actuated friction pad 18 on the backing plate 17.

A second friction pad 33 bonded to a backing plate 34, known as the indirectly actuated friction pad assembly, is mounted on the inside of the saddle member 24 remote from the hydraulic cylinder 25.

The admission of pressure fluid to the cylinder space S between the piston 26 and the bottom internal face of the cylinder 25 results in displacement of said piston and saddle member 24 in opposite directions to each other. Such movement of piston 26 urges the brake pad 18 into contact with the brake disc 14 while the saddle member 24 receives a sliding movement under the reaction force resulting from contact of the piston 26 operated pad 18 with the friction disc 14 to bring the pad 33 on the opposite side of the friction disc 14 into contact therewith.

When the brake is applied, the drag on the directly actuated pad 18 is taken through the backing plate 17 by one or other of the arms 15 on which the backing plate 17 is guided according to the direction of rotation of the disc 14.

A second drag on the indirectly actuated pad 33 tends first to turn the saddle member 24 in a rotational direction according to the rotation of the disc 14. As a result, the rubber rings 28 and 29 are deformed and the component of the drag force tending to turn the saddle member 24 is taken partly by one or other of the pins 22 and partly by the engagement of one or other of the ears 31 of the saddle member 24 with the corresponding rail 16 according to the rotational direction of the friction disc 14.

The cylinder 25 has a port 35 which provides a passage for the flow of hydraulic or other pressure fluid, the port being for connection to a source of pressure fluid, and a further breather port 36.

What is claimed is:
1. A disc brake comprising;
 a friction disc secured to a rotational portion of a vehicle wheel assembly to rotate therewith,
 a stationary member secured to a fixed portion of the vehicle wheel assembly,
 a movable member movably mounted on said stationary member for movement in the direction of the rotational axis of said friction disc,
 fluidly operated brake actuating means mounted within said movable member,
 a first brake pad assembly slidingly fitted on said stationary member for shifting in the direction of the rotational axis of said friction disc to be applied to one face of said friction disc by said brake actuating means during the braking operation whereby torque is transmitted from said first pad directly to said stationary member,
 a second brake pad assembly carried by said movable member to be brought into contact with the opposite face of said friction disc under reaction force derived from said first pad assembly whereby torque is transmitted from said second pad assembly to said stationary member through said movable member,
 a pair of parallel pins extending from said stationary member in the direction of the rotational axis of said friction disc,
 a pair of bores provided in said movable member diametrically larger than said pins to receive said pins in spaced relationship between the internal face of said bores and the face of said pins,
 at least one elastic ring surrounding each pin so as to fill the annular space formed between said pins and said bores,
 a first guiding means provided on said movable member, and
 a second guiding means including a pair of lugs radially extending from said stationary member, a pair of arms extending from said lugs parallel with the rotational axis of said disc, and a pair of parallel guide rails provided on said arms for cooperation with said first guiding means, said first guiding means and said guide rails on said arms being spaced apart by the resilient force of said elastic rings when said disc brake is in a non-braking condition and said first guiding means being in sliding contact with one of said guide rails when said disc brake is in a braking condition by deformation of said elastic rings whereby the torque from said second brake pad is transmitted to said one guide rail and said pins of said stationary member through said movable member.
2. A disc brake according to claim 1 wherein said first guiding means comprise a pair of ears radially extending from said movable member for cooperation with said pair of guide rails respectively.
3. A disc brake according to claim 2 wherein said first brake pad assembly is provided with means for sliding engagement with said second guiding means.
4. A disc brake according to claim 3 and further comprising a spring member secured to said arms for resiliently engaging said ears of said first guiding means of said movable member and said first brake pad assembly to prevent rattling.

* * * * *

UNITED STATES PATENT AND TRADEMARK OFFICE
CERTIFICATE OF CORRECTION

PATENT NO. : 4,074,795
DATED : February 21, 1978
INVENTOR(S) : Toshio Kondo et al It is certified that error appears in the above-identified patent and that said Letters Patent are hereby corrected as shown below:

In the heading at item [73], after "Aisin Seiki Kabushiki Kaisha, Japan" insert and Toyota Jidosha Kogyo Kabushiki Kaisha, Japan.

Signed and Sealed this

Third Day of October 1978

[SEAL]

Attest:

RUTH C. MASON
Attesting Officer

DONALD W. BANNER
Commissioner of Patents and Trademarks